United States Patent Office 3,776,861
Patented Dec. 4, 1973

3,776,861
DRY POWDER BUBBLEBATH COMPOSITION
Marvin Mausner, Teaneck, and Julian A. Rachels, Jr., Ridgewood, N.J., assignors to Witco Chemical Corporation, New York, N.Y.
No Drawing. Filed June 7, 1972, Ser. No. 260,580
Int. Cl. C11d 1/14, 1/22, 1/37, 3/04
U.S. Cl. 252—545  6 Claims

ABSTRACT OF THE DISCLOSURE

Improved dry powder bubblebath compositions composed of separately prepared olefin sulfonate in flaked or powdered form blended with a spray dried bead composed of olefin sulfonate, linear alkyl benzene sulfonate, starch hydrolysate, magnesium sulfate and a sodium or potassium sulfate filler.

---

This invention relates to an improved bubblebath formulation in dry powder form. More particularly, the invention relates to bubblebath formulations which contain alpha-olefin sulfonate surfactant as the principal foaming agent and a novel method for preparing such olefin sulfonate compositions.

The successful formulation of alpha-olefin sulfonate dry powder bublebath formulations has presented a number of formidable problems. More particularly, it has been noted that the conventional spray-drying manufacture of an alpha-olefin sulfonate bubblebath composition in dry powder form has presented difficulties with regard to the density of the finished product, a marked tendency toward over-dustiness, a poor quality bead which breaks down in packaging and transport as well as serious air pollution problems due to the relatively large quantity of free oil which is present in the olefin sulfonate itself. Applicants' invention is based on the discovery that these numerous and interrelated problems can be overcome through utilization of separately prepared olefin sulfonate and filler bead components, the finished composition being prepared using a dry blending technique.

In accordance with the present invention, there has been discovered an improved dry powder bubblebath composition which comprises a dry blended admixture of the following separately prepared components:

(a) About 5 to 25, preferably 10 to 15, parts by weight of an alpha-olefin sulfonate surfactant having from 10 to 22 carbon atoms in the form of the water soluble alkali metal, alkanolamine and ammonium salts, said alpha-olefin sulfonate being further characterized as being in the form of drum-dried powder or flakes; and (b) About 75 to 95, preferably 85 to 90, parts by weight of a spray dried bead consisting essentially of about 0 to 4% by weight of the aforesaid alpha-olefin sulfonate surfactant, 1 to 3% by weight of a linear alkyl benzene sulfonate sulfatant, 15 to 25% by weight of a water soluble starch hydrolysate, 4 to 12% by weight magnesium sulfate or heptahydrate thereof and about 60 to 80% by weight of a sodium or potassium sulfate.

A dry-blended admixture of the aforedescribed, separately prepared (a) and (b) components has been found highly suitable as a bubblebath and overcomes the numerous problems encountered in the manufacture of alpha-olefin sulfonate bubblebath compositions in dry powder form.

The alpha-olefins, which are sulfonated to form the detergents used in the compositions of the present invention, may contain from about 10 to 22 carbon atoms and preferably will have 12 to 18 carbon atoms. They may be derived from a variety of processes such as, for example, by wax cracking, ethylene build up or dehydration of the corresponding primary alcohol.

Exemplary alpha-olefins are 1-decene, 1-undecene, 1-dodecene, 1-tridecene, 1-tetradecene, 1-pentadecene, 1-hexadecene, 1-heptadecene, 1-octadecene and the like and mixtures of the aforesaid. Sulfonation of these long chain olefins is typically carried out utilizing sulfur trioxide mixed with a diluent. After the sulfonation is completed, neutralization and hydrolysis of the acid mixture is carried out so that any by-product sultones which are formed are converted to the corresponding hydroxy-alkane sulfonates. Thus, as is well known in the art as evidenced by U.S. Pats. 3,332,876 and 3,506,580, the term olefin sulfonate surfactant as used herein includes not only the alkene sulfonate itself but also admixtures of same formed as a result of the usual sulfonation, neutralization, and hydrolysis procedure with substantial proportions of the corresponding water soluble hydroxy-alkane sulfonates. Generally speaking, alpha-olefin sulfonate sulfactants used in the compositions of the present invention will be composed of about 40 to 60% of alkene sulfonate itself and about 60 to 40% of the corresponding hydroxy-alkane sulfonate, and preferably about 50% of each of the aforesaid makes up the alpha-olefin sulfonate surfactant.

The olefin sulfonates are generally neutralized in the form of their sodium salts and it is preferable to do so. However, they may be employed in the form of the other alkali metal, ammonium salts or lower alkanolamine, such as ethanolamine, isopropanolamine and others having up to about eight carbon atoms.

The aforesaid (a) component of the compositions of the present invention is an alpha-olefin sulfonate surfactant or foaming agent which has been provided in the form of flakes or powder by a drum-drying procedure, in sharp distinction to spray-dried products which are in the form of beads or granules. The process of drum-drying is well known to those in the art and generally is carried out by allowing a heated drum to rotate through an aqueous slurry of surfactant and allowing the dried surfactant to form on the surface of the drum whereupon it is scraped off in the form of flakes or powder. In preparing the compositions of the present invention, the drum-dried olefin sulfonate flakes or powder are simply admixed with the spray dried bead, the (b) component, which is more particularly described below. Preefrably about 10 to 15 parts by weight are admixed with 85 to 90 parts of the (b) component.

The aforesaid (b) component is a spray-dried bead which is prepared using conventional detergent spray-drying techniques and equipment. The composition of the bead is a highly significant aspect of the present invention. The spray-dried bead composition is composed of about 0 to 4% by weight of an alpha-olefin sulfonate as previously described herein; about 1 to 3% by weight of a $C_{10}$ to $C_{20}$ alkyl benzene sulfonate in the form of the alkali metal, lower alkanolamine or ammonium salt. Preferably a sodium alkyl benzene sulfonate is employed wherein the alkyl group has 12 to 16 carbon atoms.

Additionally, the spray dried bead component includes from about 15 to 25% by weight of a water-soluble starch hydrolysate. The use of such an acid or enzyme, e.g. amylase, catalyzed hydrolyzed starch carbohydrate in the compositions of the present invention is a particularly novel aspect and has been found essential for the production of a finished composition having a suitable bead strength and density to facilitate dry blending with the drum dried olefin sulfonate flakes or powder. These hydrolysates are generally characterized as having a dextrose equivalent between about 15 and 44. Particularly preferred is a cornstarch hydrolysate having a dextrose equivalent of 15 to 20. The starches may also be derived from sources such as wheat, rice, potato and the like. The hydrolyzed products contain mostly higher polysaccharides but significant proportions of di- to hexa-saccharides are present to impart water solubility. Preferably, the (b) component of the present invention will contain about 20% by weight of such a starch hydrolysate.

Further constituents of the aforesaid (b) component are from about 4 to 12% by weight, of magnesium sulfate or the heptahydrate thereof. Preferably the latter form, commonly known as epsom salts, is used in an amount of from about 8 to 12% by weight. When anhydrous magnesium sulfate is used the preferred range is, of course, from 4 to 6% due to the difference in weights of the two forms of magnesium sulfate. The (b) component also contains 60 to 80%, preferably about 65 to 75%, by weight, of an inorganic filler selected from the group consisting of sodium and potassium sulfate, with the preferred material being sodium sulfate.

Spray-drying conditions used to prepare the (b) component are somewhat varied and generally an air inlet temperature of 700° to 840° F. and an air outlet temperature of 240° to 260° F. is used. The pressure at which the slurry is pumped to the spray nozzles is in the range of 250 to 600 p.s.i.g. The slurry will generally be in the form of a 40 to 70% by weight aqueous slurry.

The spray dried filler bead so produced is then dry blended with the separately prepared drum-dried olefin sulfonate flakes or powder and the two components are intimately admixed at room temperature.

It is a significant feature of the compositions of the present invention that the foaming characteristics of the finished composition can be carefully regulated. This is due to the fact that the bulk density of the finished composition can be somewhat precisely controlled by varying the relative proportions of the aforesaid (a) and (b) components. This ability to regulate the bulk density and thereby control the foaming properties is of great commercial significance and facilitates compliance with marketing demands and packaging requirements. When the compositions are prepared utilizing the (a) and (b) components in their preferred relative proportions, the finished dry blended bubblebath composition will have a bulk density between about 0.18 and 0.21 g./cc. Broadly speaking, compositions having a bulk density between about 0.17 and 0.28 g./cc. may be prepared according to the present invention.

Dry mixing the separately prepared (a) and (b) components more particularly described herein offers a distinct advantage in the art of preparing olefin sulfonate bubblebath compositions. Spray drying of olefin sulfonate compositions, when there is a relatively high proportion of olefin sulfonate foaming agent contained in the mixture, can result in serious air pollution problems. Due to the relatively large amounts of free oil (unsulfonated hydrocarbon) present in a sulfonated alpha-olefin product as well as the manner in which the spray drying tower itself operates the release of relatively large amounts of hydrocarbons into the atmosphere can result when attempts are made to spray dry an olefin sulfonate compositions using conventional techniques. Moreover, it has been observed that even when olefin sulfonates are spray dried at the desired level, i.e., about 15 to 20% by weight of the finished composition, the product is commercially unsuitable in that it is characterized by poor bead strength and a tendency toward overdustiness. The compositions of the present invention are free of these difficulties and are a distinct improvement in dry powder bubblebath compositions.

The invention is further illustrated by the following examples which are not to be considered as limitative of its scope.

EXAMPLE 1

An aqueous slurry is prepared consisting of 65% by weight solids. The solid constituents are composed of 2 parts by weight sodium alpha-olefin sulfonate surfactant (mixture of $C_{14}$ to $C_{16}$ alpha-olefins), 2 parts by weight sodium n-dodecyl benzene sulfonate, 20 parts by weight of a water soluble cornstarch hydrolysate having a dextrose equivalent of 15 to 20, 10 parts of magnesium sulfate heptahydrate and 66 parts of sodium sulfate. The slurry is spray dried using an air inlet temperature of 700° F. and an air outlet temperature of 250–265° F. and a pressure of 270–300 p.s.i.g. 86 parts of the bead so produced are dry blended with 14 parts by weight of olefin sulfonate being the same sodium $C_{14}$ to $C_{16}$ alpha-olefin sulfonate in the form of drum dried flakes.

The final product is a dust-free, free-flowing, high-foaming bubblebath composition. The bulk density falls within the range of 0.18 to 0.21 g./cc.

The Ross-Miles Foam Test results are as follows:

| Concentration | Foam height 150 p.p.m. hardness water 25° C. | | |
|---|---|---|---|
| | 0 min. | 1 min. | 5 min. |
| 0.04% mm | 127 | 102 | 95 |
| 0.08% mm | 188 | 183 | 147 |

EXAMPLE 2

Example 1 is repeated, except that the starch hydrolysate was deleted from the slurry formulation prior to spray drying and in its place additional sodium sulfate is employed. A very dusty, fragile bead was produced and further admixture with the drum-dried olefin sulfonate flakes results in a product whose physical characteristics make it unsuitable for use as a bubblebath composition and commercially of no value.

EXAMPLE 3

All the components of Example 1 are prepared in slurry foam and spray-dried using the same temperatures and pressure as used in Example 1. A very dusty, high density (.73 g./cc.) product having unacceptable bead strength is produced. The product is unsuitable for use as a bubblebath composition.

What is claimed is:

1. A dry powder bubblebath composition which consists essentially of a dry blended admixture of:
    (a) from about 5 to 25 parts by weight of an alpha-olefin sulfonate surfactant having 10 to 22 carbon atoms in the form of the water soluble alkali metal, lower alkanolamine or ammonium salts, said surfactant being further characterized as being in the form of drum-dried powder or flakes, and
    (b) from about 75 to 95 parts by weight of a spray-dried bead consisting essentially of (i) from about 0 to 4% by weight of said alpha-olefin sulfonate; (ii) from about 1 to 3% by weight of a linear alkyl benzene sulfonate, the alkyl having 10 to 20 carbon atoms and said alkyl benzene sulfonate being in the form of the water-soluble alkali metal, lower alkanolamine or ammonium salts; (iii) from about 15 to 25% by weight of a water-soluble starch hydrolysate having a dextrose equivalent between about 15 and 44; (iv) from about 4 to 12% by weight of magnesium sulfate or the heptahydrate thereof; (v) from about 60 to 80% by weight of an inorganic filler selected from the group consisting of sodium and potassium sulfate.

2. A composition according to claim 1 wherein said (a) component is a sodium alpha-olefin sulfonate detergent having from 12 to 18 carbon atoms.

3. A composition according to claim 1 wherein said (b) (ii) component is a sodium alkyl benzene sulfonate wherein the alkyl group contains 12 to 16 carbon atoms.

4. A composition according to claim 1 wherein said (b)(iii) component is a cornstarch hydrolysate having a dextrose equivalent of about 15 to 20.

5. A composition according to claim 1 wherein there is present from about 10 to 15 parts of said (a) component and 85 to 90 parts of said (b) component which consists essentially of about 2% by weight of said (ii) ingredient, about 20% by weight of said (iii) ingredient, about 8 to 12% by weight of said (iv) ingredient in the heptahydrate form and about 65 to 75% by weight of said (v) ingredient.

6. A composition according to claim 5 having a bulk density between about 0.18 and 0.21 g./cc.

References Cited

UNITED STATES PATENTS 3,506,580  4/1970  Rubinfeld et al. _____ 252—555

FOREIGN PATENTS 1,221,901  2/1971  Great Britain.

OTHER REFERENCES

Alexander: "Bubble Baths," Manufacturing Chem. & Aerosol News, February 1965, pp. 41–43.

Jellinek: "Formulations and Function of Cosmetics," 1970, Wiley, Interscience, New York, pp. 531–537 (chap. 12).

Sagarin: Cosmetics, Science & Technology, chap. 27, "Bath Preparations" by O. Davenport, Interscience Publishers, New York, 3rd print. (1966), pp. 651–3 and 655–8.

Stepan Chem. Co., "Bio-Terge AS–35CL," (data sheet), September 1967, pp. 1–5.

LEON D. ROSDOL, Primary Examiner

P. E. WILLIS, Assistant Examiner

U.S. Cl. X.R.

252—555, 556, 558